US006987562B2

(12) United States Patent
Terui

(10) Patent No.: US 6,987,562 B2
(45) Date of Patent: Jan. 17, 2006

(54) OBJECT DETECTING APPARATUS

(75) Inventor: Takekazu Terui, Kariya (JP)

(73) Assignee: Denso Corporation, Karitya (JP)

( * ) Notice: Subject to any disclaimer, the term of this patent is extended or adjusted under 35 U.S.C. 154(b) by 31 days.

(21) Appl. No.: 11/076,299

(22) Filed: Mar. 9, 2005

(65) Prior Publication Data

US 2005/0200840 A1   Sep. 15, 2005

(30) Foreign Application Priority Data

Mar. 9, 2004   (JP) ............................. 2004-065923

(51) Int. Cl.
*G01C 3/08* (2006.01)
*G01N 4/88* (2006.01)
(52) U.S. Cl. ............... 356/237.2; 356/237.1; 356/4.01; 356/4.08; 356/141.1; 356/5.01
(58) Field of Classification Search .. 356/237.1–237.3, 356/3.07–3.09, 141.1, 4.01–4.08; 180/169; 340/435–436
See application file for complete search history.

(56) References Cited

U.S. PATENT DOCUMENTS

| 4,632,543 | A | * | 12/1986 | Endo | 356/5.08 |
| 5,515,156 | A | * | 5/1996 | Yoshida et al. | 356/5.01 |
| 5,625,447 | A | * | 4/1997 | Kikuchi et al. | 356/4.01 |
| 5,864,391 | A | * | 1/1999 | Hosokawa et al. | 356/4.01 |
| 5,933,225 | A | * | 8/1999 | Yamabuchi | 356/5.01 |
| 6,087,975 | A | * | 7/2000 | Sugimoto et al. | 342/70 |
| 6,301,003 | B1 | * | 10/2001 | Shirai et al. | 356/4.01 |
| 6,504,600 | B2 | * | 1/2003 | Kawaguchi et al. | 356/4.01 |
| 6,671,037 | B2 | * | 12/2003 | Isogai et al. | 356/4.01 |

FOREIGN PATENT DOCUMENTS

| JP | 8-094757 | 4/1996 |
| JP | 2002-031685 | 1/2002 |

\* cited by examiner

*Primary Examiner*—Gregory J. Toatley, Jr.
*Assistant Examiner*—Sang H. Nguyen
(74) *Attorney, Agent, or Firm*—Harness, Dickey & Pierce

(57) ABSTRACT

An object detecting apparatus having a laser radar with a single light sensing element for foreign matter detection is disposed behind a front grille of a vehicle. The apparatus includes a projection window. The apparatus uses a laser beam for object detection. The laser beam includes a main portion, an upper scattered portion, and a lower scattered portion. The single light sensing element is so positioned that it collects reflection of the lower scattered portion of the laser beam reflected on the projection window and reflection of the upper scattered portion of the laser beam reflected on the front grille.

6 Claims, 3 Drawing Sheets

OBJECT DETECTING APPARATUS

CROSS REFERENCE TO RELATED APPLICATION

This application is based on Japanese Patent Application No. 2004-65923 filed on Mar. 9, 2004, the disclosure of which is incorporated herein by reference.

FIELD OF THE INVENTION

The present invention relates to an object detecting apparatus disposed on a vehicle, more specifically to an object detecting apparatus having a foreign matter detection function.

BACKGROUND OF THE INVENTION

A conventional object detecting apparatus disposed on a vehicle is disclosed in a Japanese Patent Document JP-A-2002-031685. The apparatus comprises a light emitting device that emits a laser beam, a polygonal mirror in a shape of a six-sided horizontally-sliced pyramid that rotatably reflects the laser beam, and a light receiving device that picks up reflection of the laser beam by an object. The apparatus projects the laser beam by reflecting by the polygonal mirror toward a space in a front area of the vehicle. The laser beam reflected by the polygonal mirror is so controlled that it scans a predetermined area of space in the front area of the vehicle. Reflection of the laser beam from, for example, a preceding vehicle is received by the light receiving device and gives a measurement of distance to the vehicle based on an elapsed time between projection and reception of the beam.

The object detecting apparatus may give a false measurement of distance when a sensor surface such as a light projection window for laser beam projection or the like has foreign matter such as dirt that interferes with the laser beam. In addition, when the object detecting apparatus is disposed behind a front cover (or a front grille) of a vehicle, dirt on the cover has the same effect as the dirt on the light projection window.

Therefore, the foreign matter in a path of the laser beam, as shown in a schematic diagram of FIG. 6, is detected by collecting reflection of the laser beam reflected by the foreign matter. That is, the laser beam projected toward a front space of a vehicle from a light-emitting diode J2 in a case J1 is reflected by the foreign matter on a sensor surface J3 and by the foreign matter on a surface of a front cover J4 of a vehicle, and is detected by light sensing elements J5 and J6, respectively.

However, in the conventional apparatus, two light sensing elements J5 and J6 are employed to detect the dirt on the sensor surface J3 and the dirt on the front cover J4. The redundancy of the sensing elements leads to a problem that an increased number of parts for the apparatus and an increased cost of production are required.

The object detecting apparatus is typically installed in a hole or the like disposed on a front bumper of a vehicle. Installation of the apparatus in the hole of the front bumper worsens a styling of the vehicle. In order not to worsen the styling, various positions of installation are proposed. In one installation, the apparatus is disposed behind a front grille, and the laser beam passes between two crosspieces of the front grille.

The position of the apparatus behind the grille equates the grille with the front cover in the schematic diagram of FIG. 6. That is, dirt on the grille may interfere with the laser beam and may result in a false measurement of distance.

Therefore, it is necessary to detect the dirt on the grille in order to have a correct measurement of distance. This situation leads to the same problem that two light sensing elements being disposed besides the light receiving device for distance measurement have to be employed to detect the reflection of the laser beam from both of the dirt on the sensor surface and the dirt on the grille surface.

SUMMARY OF THE INVENTION

It is an object of the present invention to provide an object detecting apparatus having a foreign matter detection function that detects one or more pieces of foreign matter in plural positions by one light sensing element. That is, pieces of foreign matter such as dirt or the like sticking on two different points of a front portion of a vehicle. For example, a piece of dirt sticking on a surface of a light receiving device of the object detecting apparatus and the other piece of dirt sticking on a surface of a front cover or a grille of a vehicle, are detected by single light sensing element.

According to the present invention, an object detecting apparatus with a case includes a light emitting device for projecting a laser beam as a scan beam, a light projection window for laser beam projection, a light reception window for laser beam reception, and a light receiving device. The object detecting apparatus is disposed behind a front grille of a vehicle and projects a laser beam from the light emitting device through the light projection window and an opening of the front grille, and receives reflection of the laser beam reflected by an object in a front area of the vehicle with the light receiving device. The apparatus, as a distance measurement system, gives a measurement of distance to the object based on an elapsed time between projection and reception of the laser beam.

The apparatus, as a self-check function, has a foreign matter detection function. That is, the foreign matter detection function basically detects pieces of foreign matter in two different positions by single light sensing element. For example, a lowermost portion of the laser beam being reflected at a point on a lower periphery of the light projection window, and an uppermost portion of the laser beam being reflected at a point on a lower end of a crosspiece of the front grille hanging just above an opening for laser beam projection, proceed on the same path. The detected reflection of the laser beam is converted to a detection signal in the light sensing element and processed in a detection circuit.

Positional relationship of the pieces of foreign matter detected by this apparatus defines the locations of the light sensing elements used for the foreign matter detection function. That is, for example, two diagonal lines crossing each other are defined by four points of foreign matter locations, two points on both upper and lower edges of the light projection window and other two points on two inner edges of two opposing crosspieces of the front grille in a front of the light projection window. The points on these edges represent foreign matter such as pieces of dirt, and the lines defined by these points represent paths of the reflected laser beam. Therefore, two diagonal lines crossing each other defined by these points extend inward to the case to the position of the light sensing elements used for the foreign matter detection function. That is, the light sensing element is disposed in at least one of two positions where extensions of the two diagonal lines cross a part disposition surface such as a substrate.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

An object detecting apparatus according to a first embodiment of the present invention is described with reference to a cross-sectional view of the apparatus shown in FIG. 1.

Figure 1:
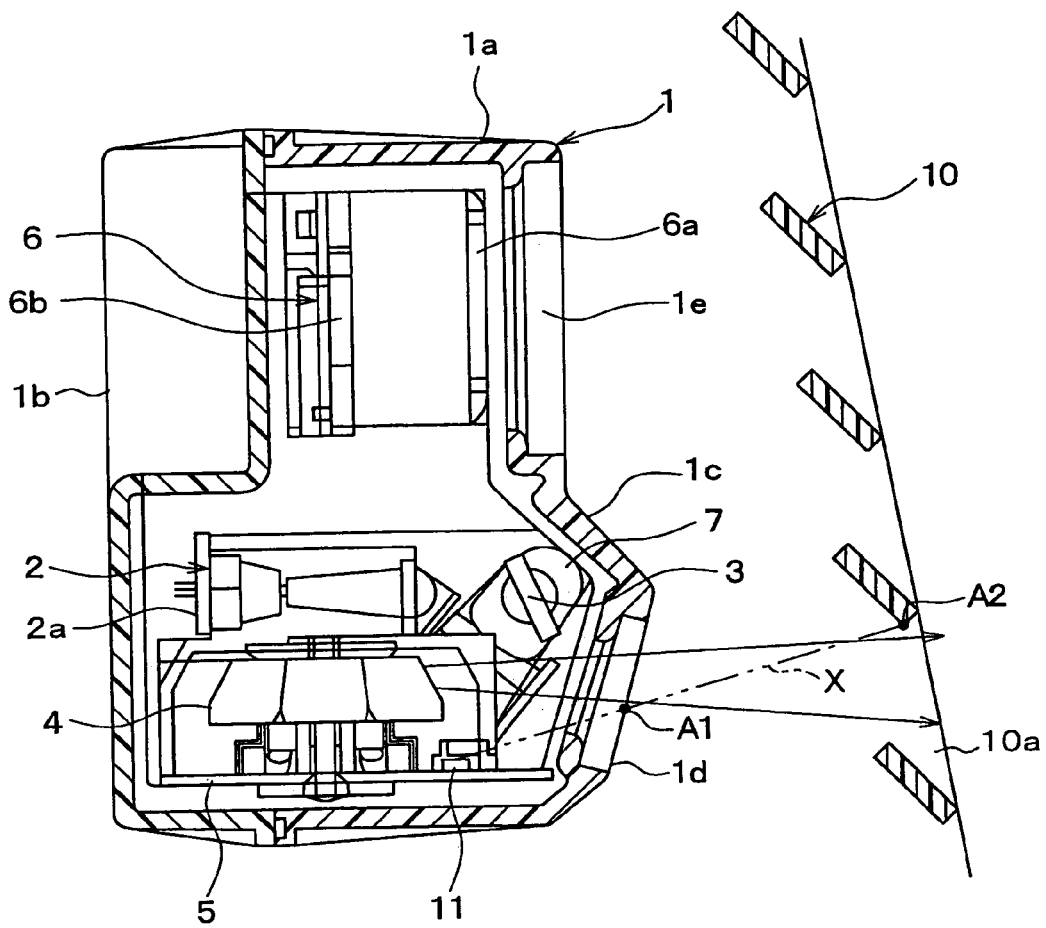
FIG. 1 is a schematic cross-sectional view of an object detecting apparatus according to a first embodiment of the present invention.

As shown in FIG. 1, the object detecting apparatus is installed toward a front (right in FIG. 1) of a vehicle, for example, behind a front grille 10, and is used as a laser radar of a cruise control system for a distance measurement apparatus that measures a distance to an object such as a preceding vehicle or the like.

The object detecting apparatus is enclosed in a substantially cubic resin case 1 with various parts contained therein. The case 1 includes a first case 1a and a second case 1b. The first case 1a is in a box shape having an opening on one side. A space in the first case 1a encloses various parts. The first case 1a includes a wall portion 1c made of black resin, and a projection window 1d and a reception window 1e both made of transparent material such as glass, acrylic resin or the like.

The projection window 1d and the reception window 1e of the apparatus are so arranged that openings of the front grille 10 face both windows 1d and 1e when the apparatus is installed in a vehicle.

The second case 1b is made of, for example, resin, and is disposed on the opening of the first case 1a. In addition, the second case 1b has a connector (not shown in the figure). The connector provides an electrical connection between an inside circuit and an outside circuit of the case 1.

The case 1 has the following parts in its lower portion and its upper portion. That is, a light emitting device 2, a mirror 3, a polygon mirror 4, and a circuit board 5 having a control circuit for the object detecting apparatus and the like (not shown in the figure) are disposed in the lower portion. A light receiving device 6 opposing the reception window 1e is disposed in the upper portion.

The light emitting device 2 is controlled by a signal from the circuit board 5. The light emitting device 2 projects a laser beam toward the mirror 3. The light emitting device 2 uses, for example, a laser diode to project a pulsing laser beam as a scan beam.

The mirror 3 reflects the laser beam projected by the light emitting device 2 in a direction toward the polygon mirror 4. The mirror 3 is tiltably supported by a support 7 disposed on the inner surface of the case 1. The mirror 3 is tilted by a motor (not shown in the figure) controlled by the control circuit on the circuit board 5, to precisely adjust a reflection angle (e.g., on the order of 1 degree).

The polygon mirror 4 is in a shape of six-sided pyramid with its pointed end being cut off by a plane parallel to the bottom of the pyramid. The polygon mirror 4 is rotatably supported by a vertical axis fixed on the circuit board 5 at the bottom of the case 1. The polygon mirror 4 is rotated by a motor (not shown in the figure) controlled by the control circuit on the circuit board 5. The polygon mirror 4 serves as the scan mirror with all of the six-sided faces being functional as a mirror.

More practically, the polygon mirror 4 reflectably directs the laser beam originating in the light emitting device 2 and reflected by the mirror 3 toward a space in a front of the vehicle through the projection window 1d of the first case 1a. Rotational movement of the polygon mirror 4 by the motor creates a scanning movement of the reflected laser beam in the lateral direction of the vehicle, and a predetermined area in a front of the vehicle is scanned.

The laser beam passes the front grille 10 through an opening 10a. This is because the projection window 1d of the apparatus is disposed in a position that opposes the opening 10a.

The light receiving device 6 is disposed above the polygon mirror 4. That is, the axis of the polygon mirror 4 points to the light receiving device 6.

The light receiving device 6 includes a Fresnel lens 6a, a light sensor 6b having, for example, a photo diode, and the like. The Fresnel lens 6a collects the laser beam reflected by an object in a front space of a vehicle, and the light sensor 6b outputs an electric current or a voltage proportional to an intensity of the laser beam received thereby. The electric current or the voltage is supplied to the control circuit on the circuit board 5.

The circuit board 5 has the control circuit having various kinds of parts to implement a distance detection function and a foreign matter detection function in the circuit. The control circuit on the circuit board 5 generates various kinds of signals to conduct distance detection and foreign matter detection, and receives responses of detection from the light receiving device 6 and a light sensing element 11.

The light sensing element 11 is disposed on the circuit board 5 in the case 1. The element 11 is closer to the light emitting device 2 than to the light receiving device 6. The light sensing element 11 is used to detect the foreign matter by collecting reflection of the laser beam from the foreign matter. Positioning of the light sensing element 11 is described with reference to FIGS. 2A, 2B and FIG. 3.

Figure 2A:
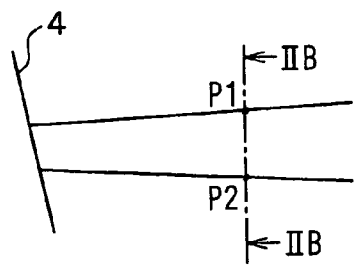
FIG. 2A is a cross-sectional view of a laser beam projected from a light projection window.
Figure 2B:
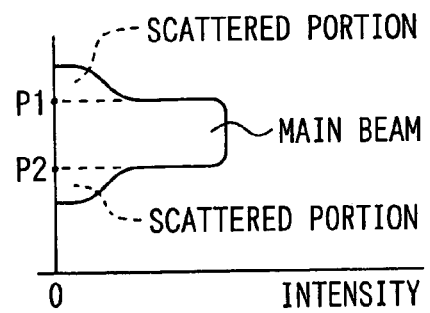
FIG. 2B is a diagram of laser beam intensity along IIB—IIB line in FIG. 2A.
Figure 3:
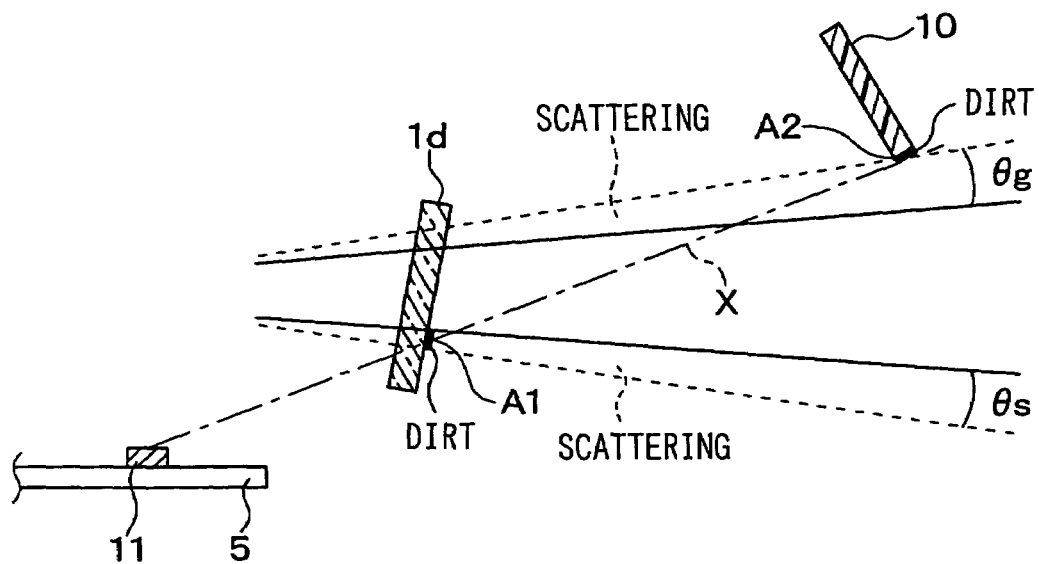
FIG. 3 is an enlarged cross-sectional view of the laser beam path in FIG. 1.

FIG. 2A shows a laser beam projected from the projection window 1d, and FIG. 2B shows an intensity distribution diagram of the laser beam taken along the IIB—IIB line in FIG. 2A. FIG. 3 shows an enlarged laser beam path from the projection window 1d to the front grille 10 extracted from FIG. 1.

FIGS. 2A and 2B show that a light beam, including a laser beam, comprises a main portion of the beam having a very high intensity between a range P1–P2 and a scattered portion of the beam surrounding the main portion having a decreased intensity. The main portion of the beam exists at the center of the beam and the scattered portion of the beam surrounds the main portion. Basically, only the main portion of the beam is used for distance detection, and the rest of the beam scatters is disregarded.

However, the scattered portion of the beam can be projected onto the edges of the front grille 10 when the main portion of the beam is projected outward through the opening 10a of the front grille 10 by adjusting optical devices such as the polygon mirror 4 and the like, as shown in FIG. 3.

In this case, an angle θg and an angle θs indicate angles of the upper scattered portion of the laser beam and the lower scattered portion of the laser beam, respectively. The scattered portion of the laser beam described above is a so-called "stray light (ghost light)." The scattered portion of the laser beam causes a problem such as a false measurement or the like when it is reflected by the foreign matter in a direction of the light receiving device 6. Therefore, the foreign matter on the front grille 10 and the projection window 1d has to be detected even when the foreign matter is located in an area that is only lit by the scattered portion of the laser beam.

Both of the upper and the lower scattered portions of the laser beam substantially have the same intensity. Therefore, a position of the light sensing element 11 is determined based on a point A1 in the lower scattered portion of the laser beam projected on the projection window 1d, i.e., the scattered portion within the angle θs in FIG. 3, and a point A2 in the upper scattered portion of the beam projected on a crosspiece of the front grille 10, i.e., the scattered portion within the angle θg in FIG. 3. That is, a line X drawn from the point A2 to the point A1 points to the position of the element 11 on the circuit board 5.

The line X defines a direction of reflection of both of the upper scattered portion of the beam and the lower scattered portion of the beam. That is, the object detecting apparatus is so positioned, relative to the front grille 10, that the upper scattered portion of the beam reflected by the foreign matter on the front grille 10, and the lower scattered portion of the beam reflected by the foreign matter on the projection window 1d both proceed on the same path defined as the line X to reach the light sensing element 11 on the circuit board 5.

The position of the light sensing element 11 defined in the above-described manner is beneficial for cost reduction and size reduction of the device, because the single light sensing element 11 can receive the reflections of the scattered portions of the beam from both of the foreign matter on the front grille 10 and the foreign matter on the projection window 1d as shown in FIG. 3.

The object detecting apparatus is, for example, installed in an automatic cruise control system, and a distance to a preceding vehicle is calculated by using a distance detection function of the circuit board 5 when the automatic cruise control system is turned on.

That is, the laser beam from the light emitting device 2 is reflected by the mirror 3 and the polygon mirror 4 and projected toward a space in a front of the vehicle through the projection window 1d. Reflection of the beam by an object in the front area comes in through the reception window 1e and collects to be focused on the light sensitive element 6b.

The light sensitive element 6b generates an output current or an output voltage that is proportional to the intensity of the laser beam reflected by the object and received. The control circuit receives this output current or voltage to calculate a distance to the preceding vehicle based on an elapsed time between projection and reception of the laser beam, and the speed of the laser beam using the following formula.

(Formula)

$$\text{Distance to a preceding vehicle} = \text{speed of the laser beam} \times \text{elapsed time}/2$$

When the distance to the preceding vehicle is calculated, a signal representing the calculated distance is sent out to an outside circuit of the case 1, e.g., an engine ECU, a brake ECU or the like, through the connector. In this manner, the automatic cruise control system controls an engine output and/or a braking force to maintain a predetermined distance to the preceding vehicle.

The foreign matter detection function is executed in the control circuit on the circuit board 5, besides the distance detection function, when the automatic cruise control system is turned on.

As shown in FIG. 3, the lower scattered portion of the laser beam reflected by the polygon mirror 4 passes through a predetermined position of the projection window 1d. The upper scattered portion of the laser beam projected through the projection window 1d hits, for example, on the lower edge (A2) of a crosspiece of the front grille 10. These scattered portions of the laser beam will be randomly reflected by the foreign matter such as dirt or the like if a path of the scattered portion of the beam is blocked by the foreign matter, and reflection of the scattered portion is directed toward the light sensing element 11.

The intensity of the reflection of the scattered beam varies according to an amount of the foreign matter, and thus the amount of the foreign matter is output from the light sensing element 11 as a detection signal represented by the output current or the output voltage. Therefore, the foreign matter detection function in the control circuit of the circuit board 5 can determine if there exists foreign matter on the projection window 1d and/or the front grille 10 based on the detection signal from the light sensing element 11.

Figure 4:
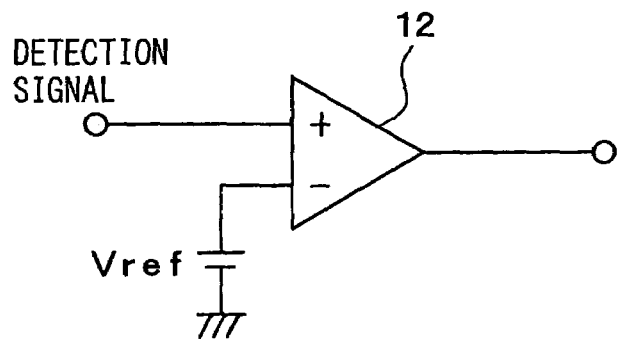
FIG. 4 is an example of a foreign matter detection circuit.

The foreign matter detection function is, for example, implemented as a part such as a comparator 12 shown in FIG. 4. In this case, the comparator 12 compares the detection signal represented by the output voltage with a reference voltage Vref. When the detection signal is represented by the output current, the output current is converted to a corresponding voltage for comparison with the reference voltage Vref.

The detection signal is determined as negative (no foreign matter detected) when the output voltage, proportional to the intensity of the reflected scattered beam, is lower than the reference voltage Vref, that is, the intensity of the reflection of the scattered beam is lower than a predetermined level. The detection signal is determined as positive (foreign matter detected) when the output voltage is higher than the reference voltage Vref, that is, the intensity of the reflection of the scattered beam is higher than a predetermined level.

In this embodiment of the object detecting apparatus, the reflection of the scattered beam from the dirt on the front grille 10 and the reflection of the scattered beam from the dirt on the projection window 1d are both received by the single light sensing element 11. Therefore, the dirt on either one of the two positions or on both of them can be detected based on the detection signal from the single light sensing element 11.

The scattered portion of the beam projected on the front grille 10 and the scattered portion of the beam projected on the projection window 1d have the same intensity, as described before. Therefore, the reflection intensities of the scattered portions of the laser beams reflected by the dirt on these two positions are the same. Thus, the same determination criteria (reference voltage Vref) applies for the foreign matter on both of the projection window 1d and the front grille 10.

The reference voltage Vref mentioned here corresponds to an amount of the foreign matter on the projection window 1d or the front grille 10 that is assumed to cause a malfunction of the apparatus.

The output signal of the comparator 12 is provided to the outside of the case 1 through the connector when a foreign matter on the projection window 1d or the front grille 10 is detected and confirmed using the foreign matter detection function in the control circuit of the circuit board 5. Therefore, a warning lamp on an instrument panel in a vehicle compartment, an automatic cruise control inactive sign in a meter panel or the like (not shown in the figure) is lit to inform occupants of the vehicle of the condition of the object detecting apparatus.

The object detecting apparatus has, as described above, the light sensing element 11 disposed at an intersection point of the line X and the circuit board 5. That is, the point A1 in the reflection of the scattered beam coming from the lower scattered portion of the laser beam projected on the projection window 1d, and the point A2 in the reflection of the scattered beam coming from the upper scattered portion of the laser beam projected on the front grille 10, define the line X, and the line X crosses the circuit board 5.

Therefore, the object detecting apparatus can perform the foreign matter detection function using the laser beam of its own, and reflection of the scattered portion of the laser beam from the foreign matter on both of the projection window 1d and the front grille 10 are directed to the same light sensing element 11. Consequently, the single light sensing element 11 can detect the foreign matter on both of the front grille 10 and the projection window 1d.

Second Embodiment

Figure 5:
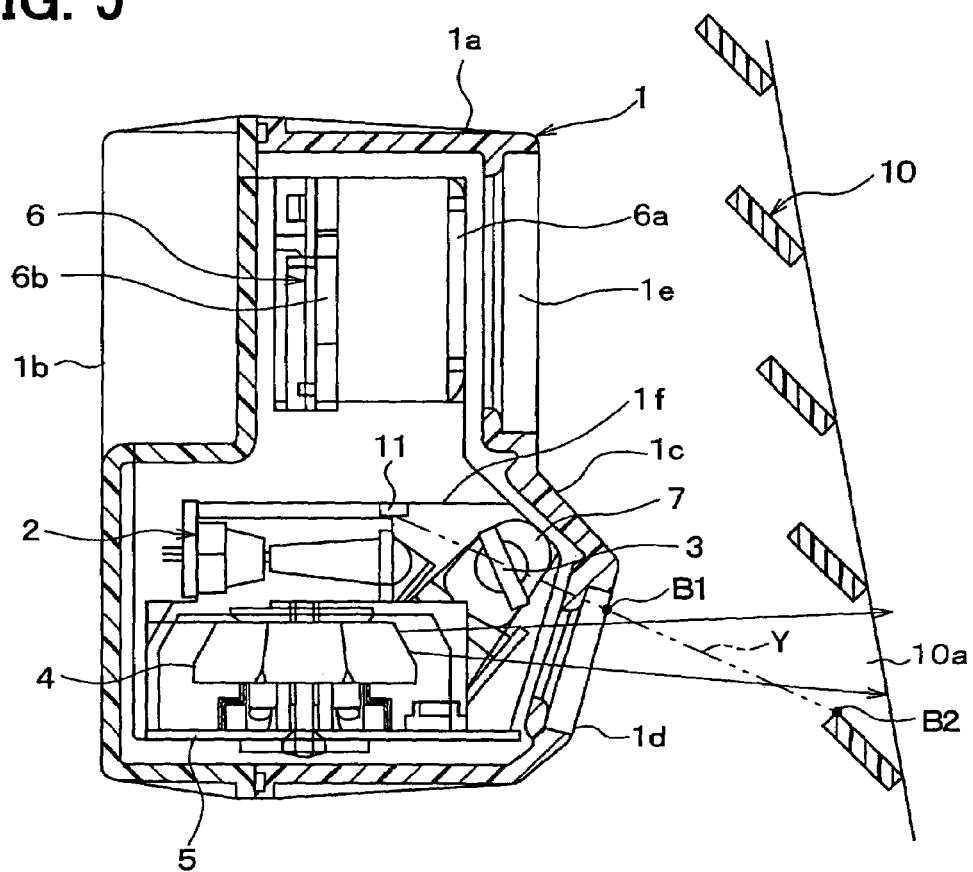
FIG. 5 is a schematic cross-sectional view of an object detecting apparatus according to a second embodiment of the present invention.
Figure 6:
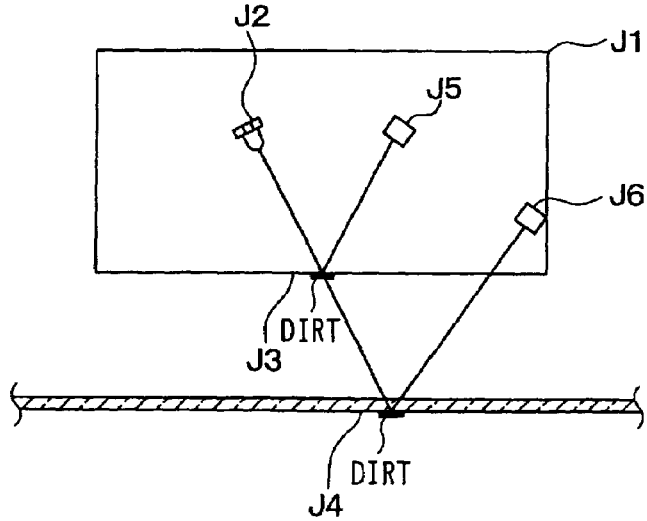
FIG. 6 is a schematic view of a conventional object detecting apparatus.

A cross-sectional view of the object detecting apparatus according to a second embodiment is shown in FIG. 5. The difference between the first embodiment and the second embodiment exists in a position of the light sensing element 11.

The light sensing element 11 for the foreign matter detection is disposed above the light emitting device 2 in this embodiment. The position of the light sensing element 11 is substantially on the opposite side of the light emitting device 2 and the polygonal mirror 4 in the first embodiment in the vertical direction.

That is, a line Y defined by two points, a first one denoted as a point B1 in the upper scattered portion of the laser beam projected on the projection window 1d and a second one denoted as a point B2 in the lower scattered portion of the laser beam projected on the front grille 10, extends to a position for the light sensing element 11. The element 11 is, for example, disposed on an inner case 1f that supports the light emitting device 2 and the like, and connected electrically to the control circuit on the circuit board 5 by a lead wire bonded to a circuit board 2a of the light emitting device 2 control circuit disposed behind the circuit board 5 or the light emitting device 2.

The position of the light sensing element 11 in this embodiment enables the element 11 to receive both of a reflection from the foreign matter in the lower scattered portion of the beam and a reflection from the foreign matter in the upper scattered portion of the beam. Therefore, either or both of the foreign matter described above can be detected based on the detection signal from the light sensing element 11.

Consequently, the object detecting apparatus in this embodiment can have the same effect as the apparatus in the first embodiment.

Other Embodiment

Although the present invention has been fully described in connection with the preferred embodiments thereof with reference to the accompanying drawings, it is to be noted that various changes and modifications will become apparent to those skilled in the art.

For example, the first embodiment of the present invention and the second embodiment of the present invention can be combined to make another embodiment. In this case, both positions of the foreign matter described in the first embodiment and the second embodiment can be detected at the same time.

Further, the components used in the object detecting apparatus can be arranged in a different manner as far as the apparatus is disposed behind the front grille 10. For example, the present invention can be applied to an apparatus that has a lateral arrangement of the projection window 1d and the reception window 1e.

Such changes and modifications are to be understood as being within the scope of the present invention as defined by the appended claims.

What is claimed is:

1. An object detecting apparatus disposed behind a front cover comprising:
   a light projection window;
   a light emitting device projecting a scan beam;
   a light receiving device receiving a reflection of the scan beam;
   an edge of the front cover defining an opening of the front cover;
   a light sensing element receiving a reflection of a scattered portion of the scan beam; and
   a control circuit,
   wherein the light emitting device projects the scan beam through the light projection window and the opening of the front cover to detect an object in a front space of the apparatus based on the reflection of the scan beam,
   wherein a foreign matter on at least one of the light projection window and the edge of the front cover is detected by using the light sensing element based on the reflection of the scattered portion of the scan beam reflected thereon,
   wherein a position of the light sensing element is located on a line defined by a first point and a second point, the first point existing on the light projection window in an area where the scattered portion of the scan beam reflects, and the second point existing on the edge of the front cover in an area where the scattered portion of the scan beam reflects, and
   wherein the control circuit determines an existence of the foreign matter based on an intensity of the reflection of the scattered portion of the scan beam collected by the light sensing element.

2. The object detecting apparatus of claim 1 further comprising:
   a light receiving window;
   wherein the reflection of the scan beam by the object in the front space is received by the light receiving device through the light receiving window.

3. The object detecting apparatus of claim 1, wherein the first point exists on the light projection window in an area where the lower scattered portion of the scan beam reflects, and the second point exists on the edge of the front cover in an area where the upper scattered portion of the scan beam reflects.

4. The object detecting apparatus of claim 1, wherein the first point exists on the light projection window in an area where the upper scattered portion of the scan beam reflects, and the second point exists on the edge of the front cover in an area where the lower scattered portion of the scan beam reflects.

5. The object detecting apparatus of claim 1, wherein the light sensing element outputs a detection signal, wherein the detection signal from the light sensing element is represented either by a current therefrom or a voltage therefrom, and wherein the detection signal is used to determine an existence of the foreign matter on at least one of the light projection window and the edge of the front cover.

6. The object detecting apparatus of claim 1, wherein the light sensing element is disposed closer to the light emitting device than to the light receiving device.

* * * * *